(12) United States Patent
Chu et al.

(10) Patent No.: US 6,850,566 B2
(45) Date of Patent: Feb. 1, 2005

(54) IMPLEMENTATION OF QUANTIZATION FOR SIMD ARCHITECTURE

(75) Inventors: Chung-Tao Chu, San Jose, CA (US); Wei Ding, Fremont, CA (US)

(73) Assignee: InterVideo, Inc., Fremont, CA (US)

( * ) Notice: Subject to any disclaimer, the term of this patent is extended or adjusted under 35 U.S.C. 154(b) by 483 days.

(21) Appl. No.: 09/937,058

(22) PCT Filed: Feb. 20, 2001

(86) PCT No.: PCT/US01/40150
§ 371 (c)(1),
(2), (4) Date: Sep. 18, 2001

(87) PCT Pub. No.: WO01/63923
PCT Pub. Date: Aug. 30, 2001

(65) Prior Publication Data
US 2003/0067977 A1 Apr. 10, 2003

Related U.S. Application Data
(60) Provisional application No. 60/184,066, filed on Feb. 22, 2000.

(51) Int. Cl.[7] .................................................. H04N 7/12
(52) U.S. Cl. .................................................. 375/240.03
(58) Field of Search ........................ 375/240.03, 240.22, 375/240.25; 348/404.1, 424.2; 382/239, 251, 253; H04N 7/12

(56) References Cited

U.S. PATENT DOCUMENTS

| 4,469,417 | A | * | 9/1984 | Masunaga et al. ........... 396/128 |
|---|---|---|---|---|
| 5,353,026 | A | | 10/1994 | Wilson |
| 5,594,679 | A | | 1/1997 | Iwata |
| 5,652,624 | A | | 7/1997 | Lippel |
| 5,845,112 | A | | 12/1998 | Nguyen et al. |
| 5,850,227 | A | | 12/1998 | Longhenry et al. |
| 5,872,965 | A | | 2/1999 | Petrick |
| 5,892,851 | A | | 4/1999 | Nguyen |
| 5,903,611 | A | | 5/1999 | Schnable et al. |
| 5,931,892 | A | | 8/1999 | Thome et al. |
| 5,991,787 | A | | 11/1999 | Abel et al. |
| 6,122,653 | A | * | 9/2000 | Kuroda ........................ 708/320 |
| 6,360,348 | B1 | * | 3/2002 | Yang ........................... 714/784 |
| 6,738,522 | B1 | * | 5/2004 | Hsu et al. .................... 382/234 |
| 6,742,010 | B1 | * | 5/2004 | Hus et al. .................... 708/401 |

* cited by examiner

*Primary Examiner*—Nhon Diep
(74) *Attorney, Agent, or Firm*—Coudert Brothers LLP

(57) ABSTRACT

A system for improving the speed of the video encoding process by decreasing the number of cycles to perform the quantization. The disclosed system achieves the improvement through use of parallel processor such as one having a Single Instruction, Multiple Data (SIMD) architecture. Concurrent processing during one instruction cycle is accomplished, thereby leading overall to the use of fewer instruction cycles. In the preferred embodiment, an MMX instruction set is used for executing four quantization in parallel. The disclosed system also achieves a higher precision of the quantization during the encoding of video signals with the SIMD architecture by using a larger multiplier and larger shift factor.

1 Claim, 5 Drawing Sheets

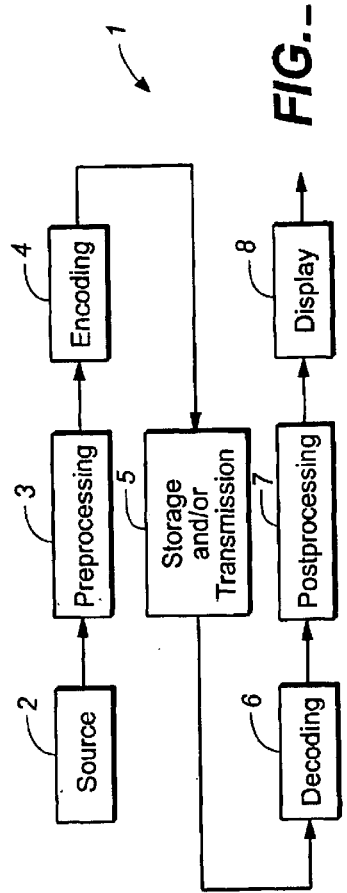
FIG._1 *(PRIOR ART)*
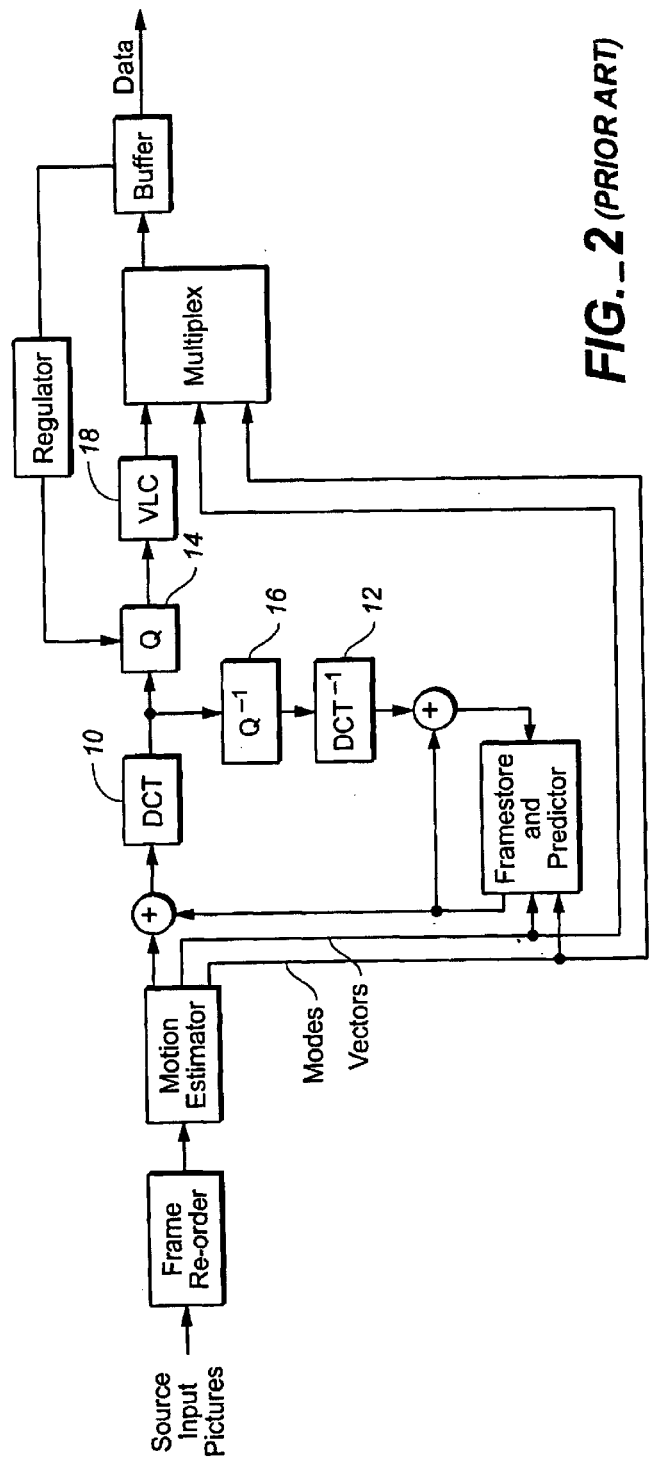
FIG._2 *(PRIOR ART)*

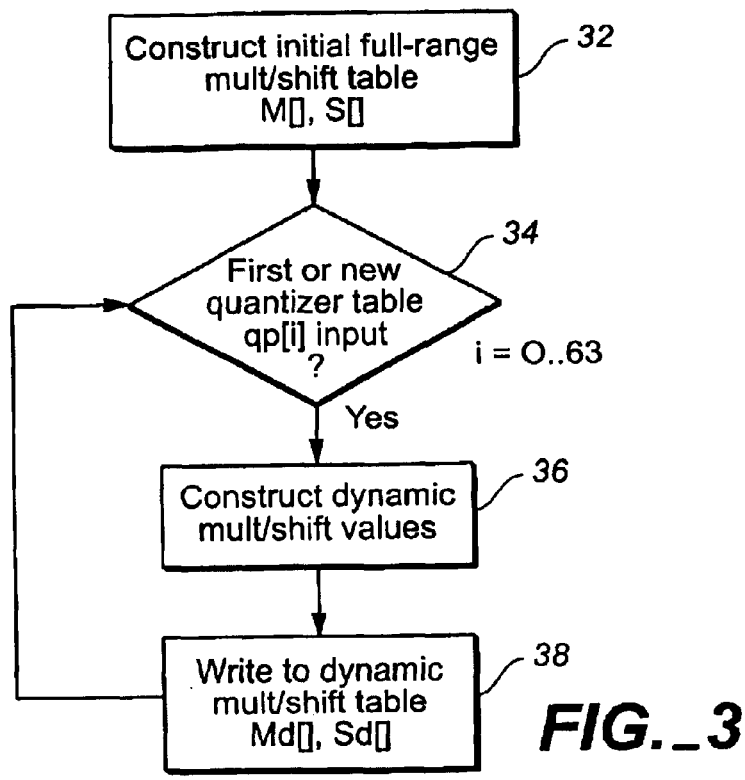
FIG._3
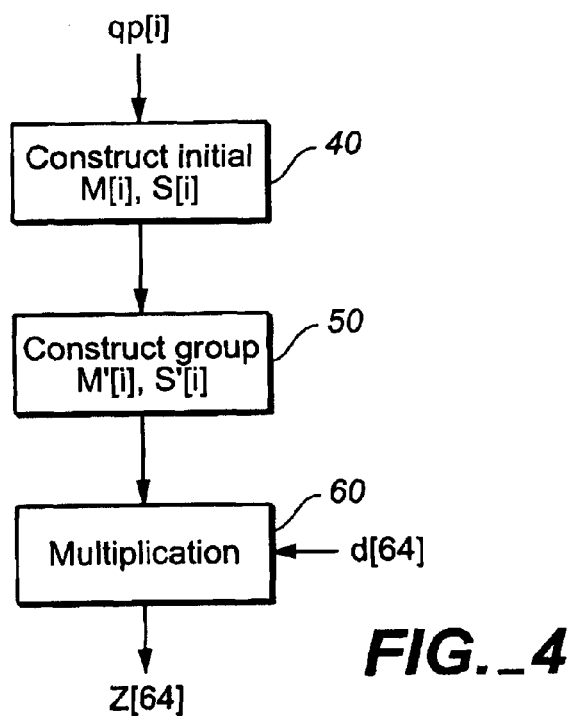
FIG._4

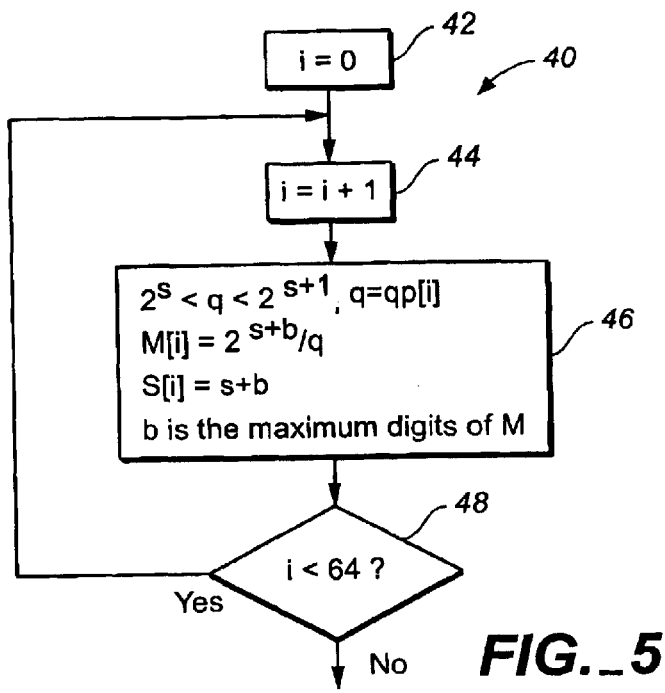
FIG._5
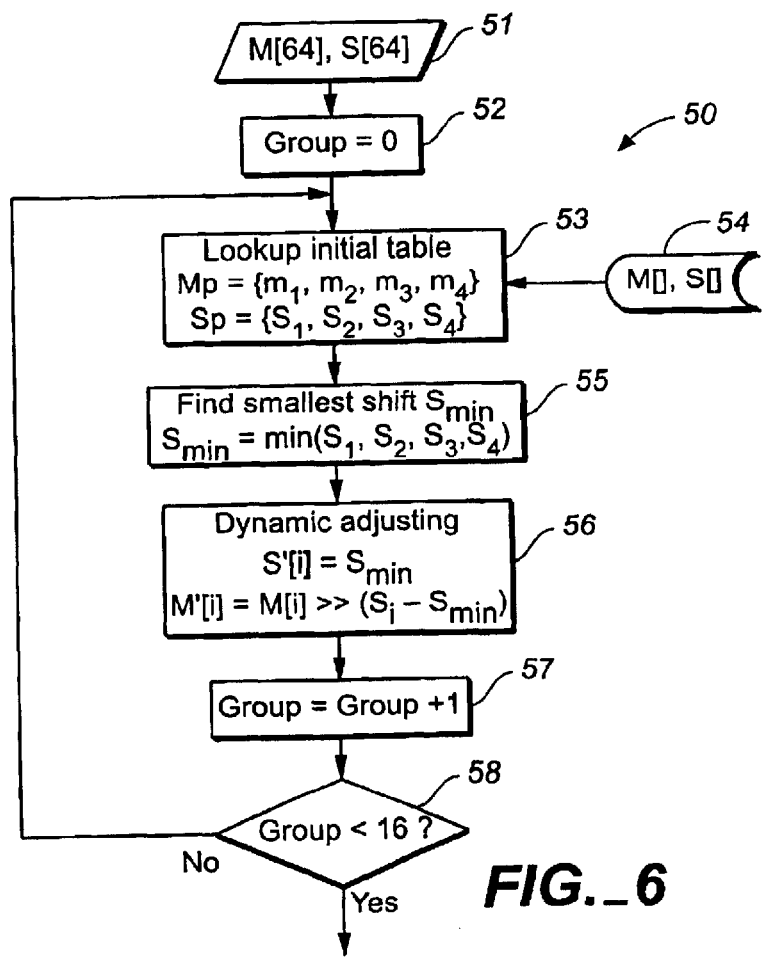
FIG._6

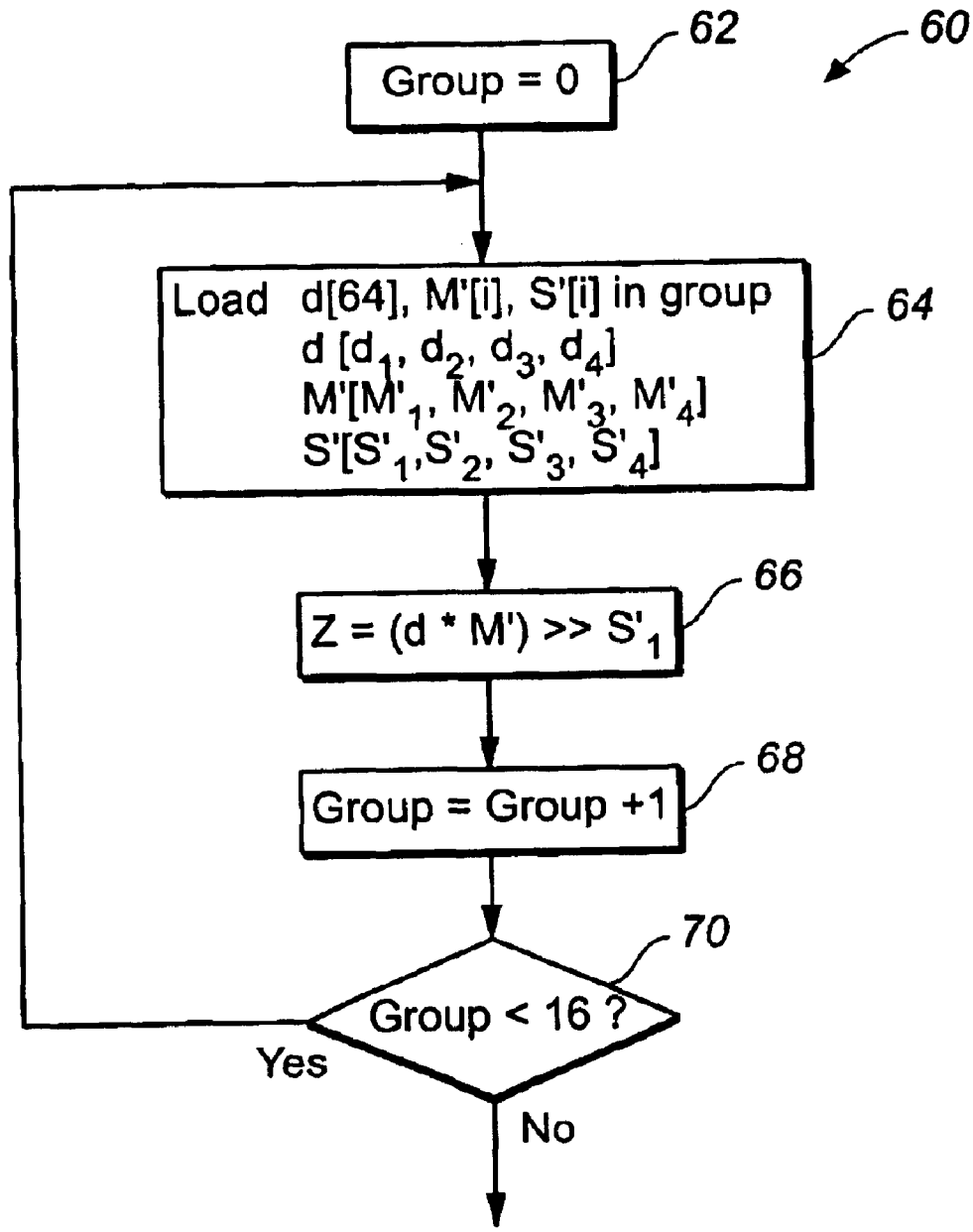
FIG._7

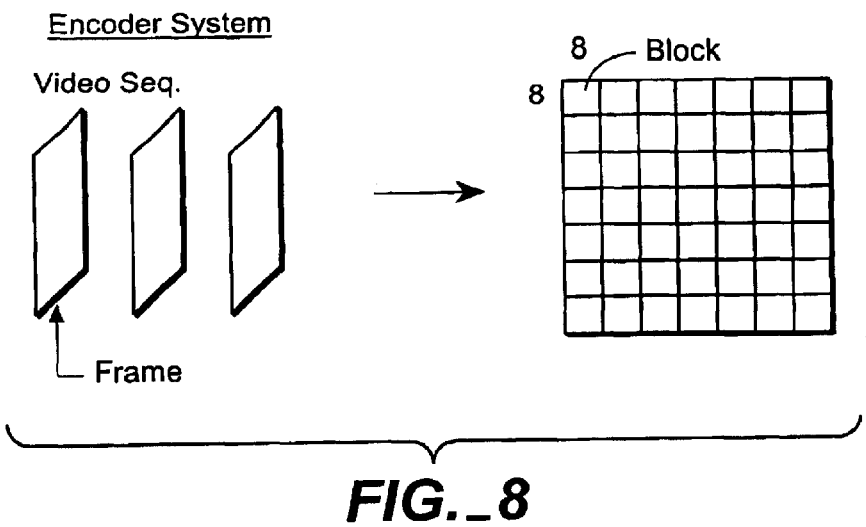
FIG._8
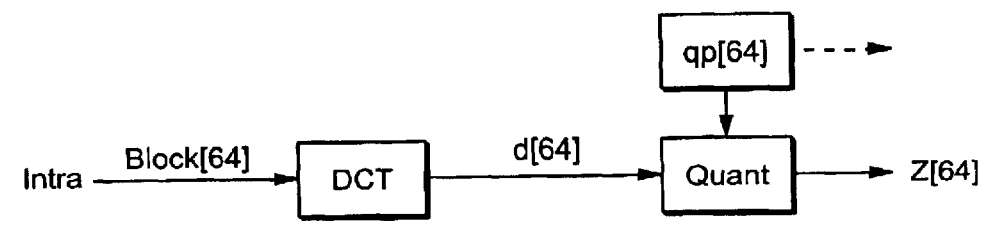
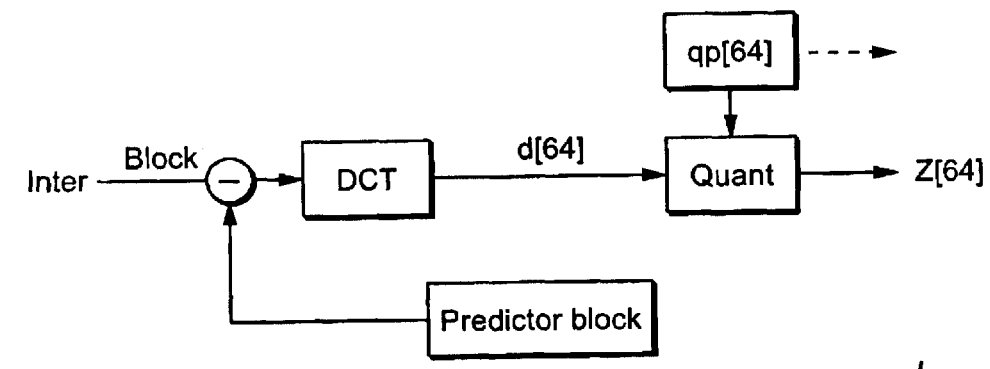
FIG._9

IMPLEMENTATION OF QUANTIZATION FOR SIMD ARCHITECTURE

CROSS REFERENCES TO RELATED APPLICATIONS

This application claims the benefit of U.S. Provisional Application 60/184,066 filed Feb. 22, 2000.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to the encoding of images moving pictures and video signals and more specifically to the quantization of the sequence of coefficients.

BACKGROUND OF THE INVENTION

International Standards followed for viewing movies pictures and video signals according to the MPEG format define the overall need for encoding and decoding video signals, which representation may take the form of successive individual pictures. Each picture may be treated as a two-dimensional array comprising picture elements, known as pels. As is conventionally known and as shown in FIG. 1 as prior art, a sequence of operations 1 must be performed before moving pictures can be viewed. A source 2 of video images that are unencoded may exist in a variety of forms, such as the CCIR 601 format. As is conventionally known by International Standards, the input video signal is digitized and represented according to luminance and two color difference signals (Y, $C_r$, $C_b$). Some type of preprocessing 3 is done on the source 2 to convert the video data into an appropriate resolution for subsequent encoding 4. For example, subsampling of the color difference signals ($C_r$, $C_b$) is done with respect to the luminance by a 2:1 ratio in both the vertical and horizontal directions. The signal is then reformatted, if necessary, as a non-interlaced signal. During encoding 4, a picture type must be determined for each picture in the sequence. The encoder may then estimate motion vectors for each 16-by-16 macroblock in a picture. Depending upon the picture-type used, one or more vectors are needed, and reordering of the picture sequence is necessary prior to encoding. After the encoding process, the bitstream may be transferred to a storage medium 5. In order to view the moving picture, a decoder 6 must be used to access the video bitstream. Subsequent to decoding, post-processing 7 of the video signal is done in order to display 8 the moving pictures.

Although International Standards require the encoder to be aware of both the capacity of the decoder buffer, and the need for the decoder to match the rate of the media to the rate of filling a buffer for holding successive pictures, the International Standards do not specify the encoding process. Rather, it merely indicates the syntax and semantics of the bitstream and the signal processing done in the decoder. As such, there are many options available for encoding the video signal.

In general FIG. 2 shows a fictional block diagram for an encoder. As shown in FIG. 2, the modules of interest include a discrete cosine transform (DCT) 10, inverse discrete cosine transform (DCT$^{-1}$) 12, quantization (Q) 14, inverse quantization (Q$^{-1}$) 16, and variable length coding (VLC) 18.

In a digital system, quantization, which may be represented as a matrix table Z[i], means the division of a range of values into a single integer, code or classification, as indicated by the following Equation (1):

$$Z[i] = \frac{d[i]}{qp[i]}, \text{ where } i = 0 \ldots 63, \quad (1)$$

where d[i] represents a block of data in matrix format, and qp[i] represents the quantization matrix table taken either from a default table of standard values or constructed as needed by one of ordinary skill in the art. The variable i represents the number of data entries within the respective matrix, and is selected to range from 0 to 63 in order to represent 64 bits for illustrative purposes. At the register level, this division operation is realized with a multiplication operation followed by a shift operation, as indicated by following Equation (2):

$$Z[i] = d[i] \times \frac{1}{qp[i]}, \text{ where } i = 0 \ldots 63, \quad (2)$$

where $1/qp[i]$ is a multiplier, that is, a number less than one represented as a fixed point found by taking the inverse function of qp[i] and completing a shift up (<<) by a certain number of bits. Thus, the inversion operation may be represented according to the following equation, $$\overline{qp[i]} = \frac{1}{qp[i]} << \text{shift}, \quad (3)$$

where the shift up of a certain number of bits is done in order to represent an integer value. Accordingly, Equation (1) may be realized by, $$Z[i] = d[i] \times \overline{qp[i]} >> \text{shift}, \quad (4)$$

where a shift down (>>) of a certain number of bits is performed in response to the shift up previously implemented for the inversion in Equation (3).

The present inventors have observed that conventional encoders and quantization systems lack speed and require more instruction cycles than are necessary. It would thus be ideal to improve the speed of encoding by using faster processors for computing the quantization. Certainly, by using a faster processor, as for example a parallel processor, fewer instruction cycles are required to perform the quantization of Equation (4). What is needed is a way to implement the quantization using the physical constraints of the parallel processing architecture.

Yet, further problem encountered with using parallel processors concerns performing the quantization so as to achieve a high precision of coefficients. With conventional parallel processors, this challenge stems from the physical processor constraint whereby the multiplier and shift operations and registers cannot exceed a certain number of bits. Accordingly, what is needed is a way to obtain the highest precision of the quantizer implemented with parallel processors by using the largest multipliers, that is, with a maximum number of bits, followed by the largest feasible shift in bits.

SUMMARY OF THE INVENTION

It is an object of the present invention to improve the speed of the video encoding process by decreasing the number of cycles to perform the quantization. The present invention achieves this object by using a parallel processor such as one having a Single Instruction, Multiple Data (SIMD) architecture. In a system for encoding video image data using a processor having a plurality of elements processed in parallel, a module constructs an initial multiplication table and an initial shift table. A maximal shift value for each of the elements of a SIMD architecture is determined when a single instruction is executed. Concurrent processing of sub-registers during one instruction cycle is accomplished, thereby leading overall to the use of fewer instruction cycles. In a preferred embodiment of the invention, an MMX instruction set is used for executing four quantizations in parallel, that is, four multiplication sub-instructions executed in parallel, followed by 4 shifts in parallel.

It is a further object of the present invention to achieve a higher precision of the quantization during the encoding of video signals with the SIMD architecture by using a larger multiplier and larger shift factor. Using a module for dynamically constructing a group multiplication table and a group shift table by adjusting the initial multiplication and shift tables based on a minimum quantization table value and a corresponding maximal shift value, the largest multiplier and shift values for the parallel processing are selected with the current invention. The dynamic adjustment conforms to the physical constraints of bit lengths permitted by an SIMD architecture. A module for multiplying the video image data by the group multiplication table for each of the elements during an instruction processed in parallel is provided. The shifting of each element within a predetermined group by a constant amount according to the group shift table results in a higher precision of quantization during the encoding process.

These and other objects of the present invention will become apparent to those skilled in the art from the following detailed description of the invention and embodiments, the accompanying drawings, specification and claim

BRIEF DESCRIPTION OF THE DRAWINGS

FIG. 1 shows a functional block diagram of the prior art for the general process of encoding and decoding MPEG video signals.

FIG. 2 shows block diagram of the prior art for the encoding of FIG. 1 as indicated by International Standards.

FIG. 3 shows a flowchart of a portion of the process steps for quantization according to a preferred embodiment of the present invention.

FIG. 4 shows a system block diagram of the modules for the quantization according to the preferred embodiment of the present invention.

FIG. 5 shows a flowchart of the process steps for constructing the initial multiplication and shift tables of FIG. 4.

FIG. 6 shows a flowchart of the process steps for constructing the group multiplication table and the group shift table of FIG. 4.

FIG. 7 shows a flowchart of the process steps for performing the quantizer multiplication and shifting according to FIG. 4.

FIG. 8 shows a schematic representation of a sequence of individual video frames compressed by dividing each frame into a block of data.

FIG. 9 shows a block diagram showing the invention is applicable to the case where each block of data from FIG. 8 can be compressed by an intrablock method or intrablock method.

DETAILED DESCRIPTION OF THE INVENTION

Referring now to the drawings in detail, the present invention is directed to a software system for quantizing coefficients during the encoding of video image data with a processor having a plurality of picture data elements processed in parallel. In particular, by using a parallel processor such as those with a SIMD architecture, and like that of Intel®'s MMX technology, the UltraSparc, PowerPC and other microprocessors, faster multimedia and communications software can be accommodated because the processing of data elements is done in parallel. By performing the multiplication and shifting involved in the quantization of coefficients during encoding using an SIMD architecture, with a single instruction cycle, multiple instructions may be implemented on the plural elements in data sub-registers.

For example in a preferred embodiment, where if the MMX instruction register accommodates 64 bits, the partitioning of the MMX instruction register into four elements (or sub-registers of 16 bits each) allows for the parallel operation of the four data elements with one instruction command. To this end, a multiply operation is performed on each of the four data elements in parallel, and the shift instruction is thereafter performed on each of the four data elements in parallel. Because a fewer number of cycles are thus required as a result of this parallel processing for the quantization, the overall speed for the encoding is improved.

In the preferred embodiment, typical entry values for the quantization matrix table $qp[i]$ may range from values of 8 to 64 and even as high as 128 with no particular order of such values within the table. The inversion of particular sets of values within the quantization matrix is undertaken to implement Equation (3). Generally, for entries in the quantization matrix table, the smaller the value, the larger the value of its inverse. In turn, the larger the value of the inverse, the smaller the amount of shifting possible within a data sub-register. By contrast, the larger the entry in the quantization matrix, the smaller the value of its inverse and the larger the amount of shifting available within a data sub-register before reaching the maximum amount of shifting permitted within the data sub-register. What the present inventors have realized is that in order to accommodate the physical constraint of the sub-registers in the SIMD architecture and to maximize the precision of the quantization, predetermined sets or groups of entry values from the quantization matrix must be preprocessed, and the data block $d[64]$ must also be processed in parallel according to such groups. As will be described in more detail below, the quantization matrix table is examined in advance to locate smallest entry within the predetermined set, whose inverse would be the largest number, thereby limiting the amount of the shift for each group of values. This enables an overall maximal precision of quantization per group to be obtained by compensating for certain numbers whose individual precision will necessarily diminish due to the constraints of the physical architecture. If the values of entries in the predetermined set tend to be close, then the determination of the amount to shift according to the present invention will also tend to approximate a higher overall precision. Once this particular entry in the quantization matrix affording the smallest shift amount is determined, every entry within the predetermined set must be shifted by the same amount in each of the data sub-registers.

Referring to FIGS. 3–4, with a first module 40, an initial multiplication table $M[i]$ containing multiply factors and an initial shift table $S[i]$ containing shift factors are constructed.

This is represented by the process step 32. The input to module 40 is the quantization matrix $q\rho[i]$, where for example i=0 to 63. The output of module 40 is M[i] and S[i], where i=0 to 63. As will be described with respect to FIG. 5, the first module 40 determines the initial multiplication to be performed on the four elements each of 16 bits within the instruction register having a total of 64 bits. A second module 50 dynamically constructs a group multiplication table M'[i]and a group shift table S'[i] using as inputs M[i] and S[i] created by module 40. Module 50 constructs the group (or dynamic) multiplication and shift tables by adjusting the initial multiplication table M[i] and the initial shift table S[i] based on a maximal shift value for the predetermined set of quantizer matrix entries. As will be described in more detail with respect to FIG. 6, the maximal shift value of the predetermined set is found by determining and selecting the entry in $q\rho[i]$ having a minimum value for a predetermined set, that is $s_{min}$. As shown in FIG. 3, module 50 operates in an iterative fashion until all entries in the group tables ($M_d[\ ]$' M'[i]; $S_d[\ ]$=S'[i]) are determined. For example, step 34 is a conditional statement checking whether the entry of the quantizer matrix table $q\rho[i]$ is a first or new input. For each entry in the quantizer matrix, step 36 will construct the group (dynamic) multiplication and shift values and in step 38 write or store them to the group multiplication and shift tables. A third module 60 accepts as inputs, the group multiplication and shift tables M'[i] and S'[i], which form the outputs of module 50. As will be explained in further detail with respect to FIG. 7, module 60 performs the multiplication of the video image data, d[64], with the group multiplication and shift tables in order to produce the quantization matrix Z[64].

Referring to FIG. 5, the construction of the initial multiplication and shift matrix tables is determined using a repetitive loop until all values of each table are found. At step 42, a counter is initialized to zero and at step 44, it is incremented. At step 46, several operations take place. For each entry within the quantization table, the process determines whether such entry is within a range of a multiple of 2 based on the shift amount s, as shown by, $$2^s < q < 2^{s+1} \quad (5)$$

Since the number q is known from the quantization matrix table, in order to determine the shift value s, if the entry from the quantization table is shifted down as follows, $$q' = q >> s \quad (6)$$

$$q'' = q >> (s+1) \quad (7)$$

and if q'>0 and q''=0, then s is the shift value. If q is represented in binary form, then the shift value s is the number of bits, less 1. For example, if q=9, it takes 4 bits to represent 9 in binary form, and therefore s=3. Applied to Equation (5), $2^3 < 9 < 2^{3+1}$.

Referring back to step 46, the variable b represents number of bits in the operand for each element represented in the respective sub-register. It will be appreciated by one of ordinary skill in the art that b could be 8, 16 or 32 bits, or larger. In step 46, the multiplication matrix table M[i] contains the multiply factor which is calculated for each entry, as well as the shift factors in shift table S[i], all of which may be stored in RAM.

For example, in order to speed up the encoding process during quantization, an MMX instruction could execute four quantizations in parallel, that is four multiplications in parallel, followed by four shifts in parallel. Because MMX instructions require a fixed amount or length to enable a shift operation, the static (initial) multiplication and shift table with fixed shift amount is first constructed as described above for all quantizer values in a possible range. For example, if the quantizer ranges from 10 to 8, for a 5-bit MMX operation, the full range would be Qf={1, 2, 3, 4, 5, 6, 7, 8}, the multiplication table of multipliers would be M={32, 16, 11, 8, 6, 5, 5, 4), and the shift table would be S={5, 5, 5, 5, 5, 5, 5, 5}. In order to accommodate this SIMD architecture, the shift value must be kept the same for each quantizer value. However, by itself, the static tables do not remedy the loss of precision due the use of fewer digits. As described below, by using the most digits to perform the inversion entailing the multiplication and shifting, precision may be increased.

Another way of describing the process steps of FIG. 6 is that for module 50, the dynamic multiplication and shift tables are written to. In the case of an MMX implementation, each element acts as a datatype of 16 bits in length due to the 4 data sub-registers of the architecture used to represent a total of 64 bits. At step 51, the entries of the input multiplication and shift matrix tables, M[64] and S[64] respectively, are read in. Alternatively, these table of values may be loaded from RAM or some other storage medium, as indicated by step 54. Whichever manner the tables M[64], S[64] are read in, step 53 indicates that a lookup instruction is performed on these initial tables. More specifically, in step 53, entries within each of the multiplication and shift tables are selected by groups of predetermined size (e.g., four), corresponding to the number of data sub-registers of the SIMD architecture (e.g., MMX processors have four sub-registers each being 16 bits in length for a total of 64 bits). Accordingly for the preferred embodiment of the invention using MMX technology, each multiplication and shift table has sixteen groups of four entries each. Step 53 can essentially be referred to as loading the next four entries of each of the multiplication and shift tables for each of the groups. The nomenclature $M_p$ and $S_p$ merely designate the entries within each respective table taken or examined a predetermined number (e.g., four) at a time. It will be appreciated by those of ordinary skill in the art that each predetermined number corresponds to the number of sub-registers of the particular SIMD architecture utilized. The counter in step 52 is initialized to zero and incremented in step 57 based on the conditional step 58. initialization of the counter, group=0, between step 54 and 53 is not shown for the sake of brevity.

To obtain the highest precision using a SIMD architecture, an intermediate multiplication table and an intermediate shift table is used. These tables dynamically adjust the multiplication and shifting operations based on the quantizer input so long as there is a constant shift factor for every four quantizations in the above example. For example, for any given quantizer input (e.g., an 8×8 quantization table), an intermediate multiplication table M'[i] and an intermediate shift table S'[i] are constructed by processing every predetermined number of entries (e.g., four for MMX technology) in each matrix at a time. These intermediate tables need to be updated whenever a new quantizer table is input, which is usually done on a frame-by frame basis. However, it will be appreciated by one of ordinary skill in the art that such input can be implemented as required on a macroblock-by-macro-block basis. Furthermore, the input quantizer table is stored in a way that SIMD instructions can fetch and use the data directly.

Still referring to FIG. 6, in order to accomplish the above results, step 55 determines a maximal shift amount for each predetermined group or set of entries. That is, the shift amount is found by examining each element within group. The entry with the smallest value will require the smallest shift amount when reciprocated or inversed using processor logic. That smallest shift amount is the amount of bits a corresponding data sub-register can be shifted up without exceeding the physical constraints of the sub-register. Accordingly, the shift amount will be determined according to the smallest value within the group of entries, as designated by $s_{min}$=min $(s_1, s_2, s_3, s_4)$. In step 56, dynamic adjusting of the group multiplication and shift tables are implemented to produce M'[i] and S'[i]. As indicated by the following equation, $$M'[i]=M[i]>>(s_i-s_{min}), \quad (8)$$

the group multiplication matrix table M'[i] is constructed from the original multiplication value M[i] shifted by the original shift amount $s_i$ minus the smallest shift amount $s_{min}$. Thus, the first group of predetermined entries, {M'[1], M'[2], M'[3], M'[4]}, will be processed in parallel, respectively in each for the four data sub-registers or elements. The dynamic shift table is constructed by making all entries equal to $s_{min}$. Thus, S'[i]=$s_{min}$. Accordingly, for the first group of four entries, S'[1]=S'[2]=S'[3]=S'[4]=$s_{min}$. Because each of the shift amounts for the predetermined groups have been made equal to $s_{min}$, each element in a group is shifted by a constant shift amount. Thus, each data sub-register is shifted by a constant amount. This is required to conform with the SIMD operation, where a shift of four elements may be executed in one cycle; however, the shift amount must be the same for each element. With the present invention, although an approximation, a maximal precision is obtained while adapting to the constant shift requirements of the SIMD architecture.

Referring to FIG. 7, the multiplication completed by module 60 using the tables constructed is typically implemented with blocks of data in matrix format. Step 62 initializes a variable for the process to iterate until all groups have been processed. The variable is incremented in step 68 and the condition of whether all groups (e.g., 16) have been processed is checked by step 70. In step 64, the data block d[64] is loaded, as well as the group multiplication matrix table M'[i] and the shift multiplication table S'[i]. With each of these tables, a predetermined group of entries (e.g., four) are loaded into the elements or sub-registers. Thus, d[$d_1, d_2, d_3, d_4$] represents the first four elements of the matrix table d[64]. Similarly, M'[$M'_1, M'_2, M'_3, M'_4$] represents the first four entries of the group multiplication matrix table, and S'[$S'_1, S'_2, S'_3, S'_4$] represents the first four entries of the group shift matrix table. In step 66, the quantization process is implemented according to the multiplication and shifting down indicated in Equation (4). For each group and using respective sub-registers, the respective values from the multiplication table M'[i] are multiplied in parallel with the corresponding group of entries from the data table d and shifted down according to the contents of the group shift table in order to enable quantization of the video image data during the encoding process.

With the above preferred embodiment, an example may be illustrated for a 5 bit MMX operation. The full range is Qf=d={1, 2, 3, 4, 5, 6, 7, 8}. The initial multiplication matrix is M={32, 32, 22, 32, 26, 21, 18, 32} and the initial shift matrix is {5, 6, 6, 7, 7, 7, 7, 8}. The groups of entries taken from the quantizer table use a maximum 5 bits. Then, for each four given quantizer inputs, if qp={2, 3, 5, 7}, the Mp1=M'[1]={32, 22, 26, 18}for the first group and the Sp1=S'[1]={6, 6, 7, 7}. After dynamically unifying the shift table Ss, then Mp2={32, 22, 13, 9} and Sp2={6, 6, 6, 6}.

In another embodiment, the construction of the dynamic table is implemented when the quantization is used before the scale discrete cosine transform (DCT). The multiplier and shift are adjusted by the weighting coefficients inherited from the last stage of the scale-DCT.

It will be appreciated by those of ordinary skill in the art that the present invention may be practiced in a variety of ways and is applicable to video standards following ISO MPEG, MPEG1, MPEG2, MPEG4, H.261, H.263, H.263+ standards, as well as the ITU-Telecom H.262. As is known, a sequence of individual video frames compressed by dividing each frame into a block of data (e.g., 16×16, or 8×8 of macroblocks) may be read from a DVD-ROM, hard drive, any storage medium, as well as from capture device, digitized in real time and sent to RAM. This is shown in FIG. 8. The invention is applicable to video data generated by any of these methods. As shown in FIG. 9, the invention is also applicable to the situation where each block of data can be compressed by an intrablock method, by performing a DCT which produces a block d[64] of data. The block of data d[64] forms a first of the inputs into the quantizer, while the second inputs originate from the quantization matrix qp[64], so that the output of the quantizer is Z[64]. The present invention also works with the Intercase method shown in FIG. 9, which subtracts from the block of data another block of data (e.g., subset) called a prediction block prior to being input into the DCT function and thereafter into the quantization process.

Furthermore, still images, such as those used with .GIF and JPEG files may also be quantized with the present invention.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A system for quantizing coefficients during encoding of video image data using a processor for processing a plurality of elements in parallel, comprising:

a first module for constructing an initial multiplication table and an initial shift table;

a second module for dynamically constructing a group multiplication table and a group shift table by adjusting said initial multiplication table and said initial shift table based on a maximal shift value, said maximal shift value being associated with a minimum quantization value; and a third module for multiplying said video image data by said group multiplication table for each of said elements in parallel, and for shifting each of said elements in parallel according to said group shift table in order to produce a quantization of said data during said encoding.

* * * * *